G. W. HASKELL.
THILL-COUPLING.
No. 185,528.
Patented Dec. 19, 1876.
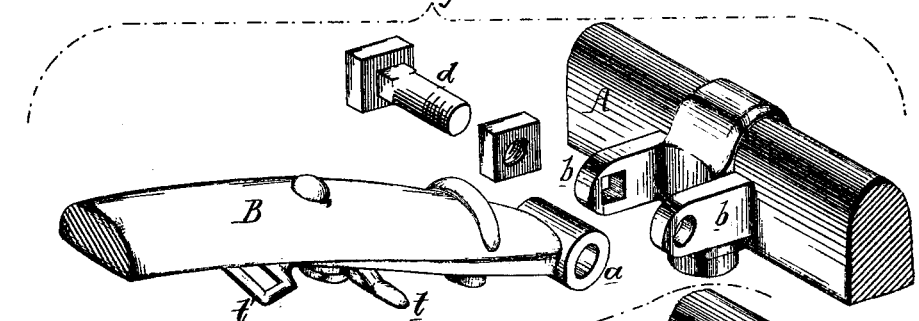
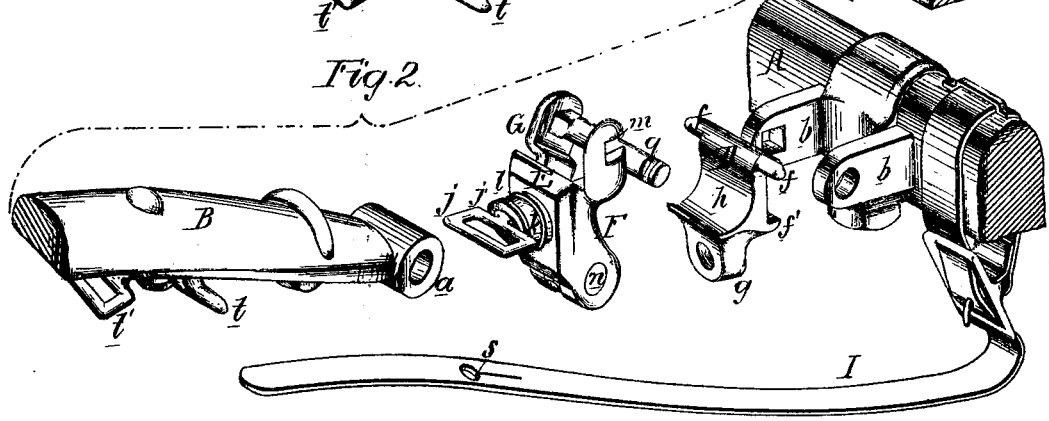
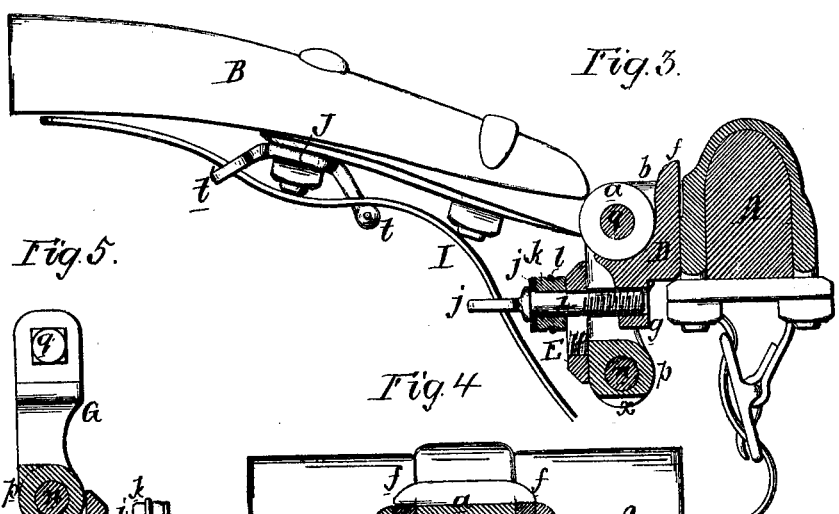
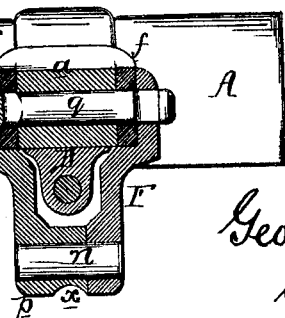
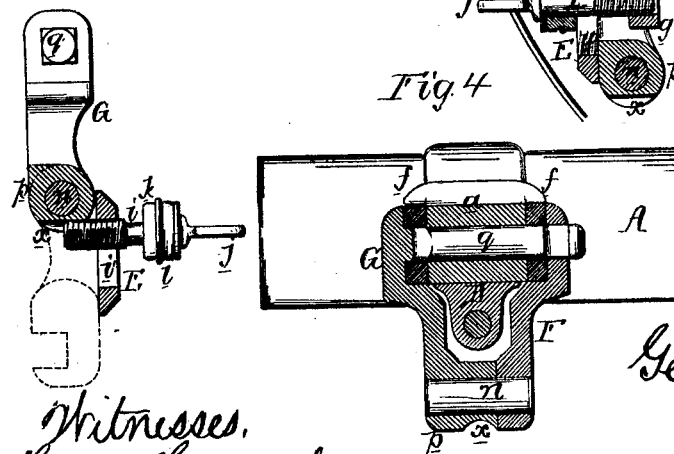
Witnesses.
Henry Howson Jr
Harry Smith
George W. Haskell
by his Attorneys.
Howson and Son
THE GRAPHIC CO. N.Y.

UNITED STATES PATENT OFFICE.

GEORGE W. HASKELL, OF PHILADELPHIA, PA., ASSIGNOR TO HIMSELF, WILLIAM H. HASKELL, AND HENRY J. HASKELL, OF SAME PLACE.

IMPROVEMENT IN THILL-COUPLINGS.

Specification forming part of Letters Patent No. 185,528, dated December 19, 1876; application filed October 25, 1876.

*To all whom it may concern:*

Be it known that I, GEORGE W. HASKELL, of Philadelphia, Pennsylvania, have invented a new and useful Improvement in Thill-Couplings for Vehicles, of which the following is a specification:

The main object of my invention is to so construct an adjustable anti-rattling thill-coupling that it can be used in connection with the usual ears on the axle and the usual eye on the shaft or pole, further objects of my invention being to provide for the ready removal and replacing of the different parts of the coupling to prevent the accidental loosening of the pressure-screw, and to prevent the loss of the same when the parts of the coupling are detached from each other. These objects I attain in the manner which I will now proceed to describe, reference being had to the accompanying drawing, in which—

Figure 1 is a perspective view of the ordinary thill-coupling; Fig. 2, a perspective view, showing the means by which I transform the ordinary coupling into an adjustable anti-rattling coupling; Fig. 3, a longitudinal vertical section of my improved coupling with the various parts in position; Fig. 4, a transverse section of the same on the line 1 2, Fig. 3; Fig. 5, a sectional view of a portion of the coupling.

A represents part of the axle, and B part of the pole or one of the shafts of a vehicle, the latter being furnished at the inner end with an eye, $a$, and the axle being furnished with a sleeve having ears $b\ b$, provided with openings for receiving the pivoting-pin $d$.

This is the ordinary thill-coupling, which is objectionable on account of the looseness of the joint and its consequent tendency to rattle. These objections I overcome in the following manner: To the space between the ears $b\ b$ is fitted a metal block, D, supported in position by projections $f\ f$ at the upper end, which rest upon the tops of the ears $b\ b$, a flange, $f'$, at the rear of the block fitting under the sleeve, and serving, with the said projections to prevent the vertical displacement of the block. In the face of the block is formed a curved recess, $h$, adapted to the eye $a$ on the shaft or pole, and the under side of the block is furnished with a lug, $g$, in which is a threaded opening adapted to a screw, $i$, the stem of the latter passing through a slot, $i'$, in a plate, E, and terminating at the outer end in an eye, $j$, between which and the plate E intervenes a washer, $j'$, and a block, $k$, of rubber, an encircling ring or band, $l$, preventing undue expansion of the said rubber block. The plate E is carried by an arm, F, having a recess, $m$, at the upper end, and pivoted at the lower end to a pin, $n$, to which is also pivoted a hub, $p$, at the lower end of an arm, G, the latter carrying at the upper end a bolt, $q$, which is notched at the outer end, and, as described hereafter, serves as a pivot-pin for the shaft or pole. The distance between the inner edges of the arms F and G is equal to the distance between the outer edges of the ears $b\ b$, the length of the bolt $q$ being somewhat greater. To the axle A is attached a strap, I, in which is formed a slot, $s$, and to the shaft or pole B is bolted a plate, J, having at one end a T-head, $t$, and at the opposite end an eye, $t'$.

It will be observed in Figs. 3 and 5 that the stem of the screw $i$ is less in diameter than the threaded portion, and that the slot $i'$ in the plate E, which is adapted to the stem, terminates in an enlarged threaded opening, $w$, so that it is impossible for the screw to be removed from the plate E until its threaded portion is brought into line with the threaded opening $w$, and then turned backward; and to still further guard against accidental removal, the opening $w$ is made so near the bottom of the plate that the hub $p$ of the arm G prevents the bringing of the threaded portion of the screw into line with the opening until the plate E is turned to the position shown in Fig. 5, when a recess, $x$, in the under side of the hub $p$, permits the screw to be moved into proper position for removal.

The mode of adjusting the above-described coupling is as follows: The block D is first adjusted to a position between the ears $b\ b$, and the eye $a$ of the shaft or pole allowed to rest in the curved recess $h$ of the block. The bolt $q$ of the arm G is then passed through the openings in the ears $b$, and through the eye $a$, (the arm F and its plate E having been previously turned down out of the way,) and when the bolt has been properly inserted the arm F is turned up, so that its recessed portion corresponds with the notched portion of the bolt $q$, the end of which projects beyond the ear $b$. The end of the set-screw $i$ is now in line with the threaded opening in the lug $g$ of the block D, and upon tightening the screw the first result will be to cause the block D to turn upon its projections $f$ until its curved face bears tightly against the eye $a$, the next result of the tightening of the screw being to force the rear edge of the recess $m$ of the plate F firmly into the notched portion of the bolt $q$, so that not only is the eye $a$ firmly clamped between the bolt $q$ and block D, but said bolt itself is firmly held in position and prevented from rattling, and the ears $b$ prevented from spreading. After the screw $i$ has been sufficiently tightened, the end of the strap I is passed through the eye $j$, turned laterally so that the T-head of the plate J on the shaft or pole can pass through the slot $s$, and then turned in line with the shaft or pole and its end passed through the eye $t'$. By this means the accidental loosening of the set-screw $i$ is effectually prevented.

In my improved coupling it will be observed that although the degree of pressure of the block D against the eye $a$ is through the rubber block $k$, and can be regulated at pleasure, the wear caused by the movement of the eye $a$ is entirely upon the metal block D, the rubber not being subjected to wear, thus overcoming a serious objection to that class of thill-couplings in which the eye on the shaft or pole bears directly against a rubber block.

It will be seen that the distinctive feature of this invention is the block D hung to the ears on the axle, and adapted to the eye on shaft or pole in connection with a device for clamping said block against the eye.

Different clamping devices may be used, but I prefer that shown and described.

I claim as my invention—

1. The combination, in a thill-coupling, of the following elements—namely, the shaft or pole B and its eye $a$, a pivot-pin, the axle A and its ears $b\ b$, a metal block, D, hung to said ears and adapted to the eye $a$, and a device by which said block D can be caused to bear upon the eye with a yielding pressure, as set forth.

2. The combination of the eye $a$ on the shaft or pole, the ears $b\ b$, the block D, the arm G, and its notched bolt $q$, the pivot $n$, and the arm F, having a recess, $m$, and plate E, carrying a set-screw, $i$, as set forth.

3. The combination of the block D, having a threaded opening, with the set-screw $i$, plate E, and rubber block or spring $k$.

4. The combination of the rubber block $k$ with its encircling band $l$.

5. The combination of the set-screw $i$ and its eye $j$, the strap I and its slot $s$, and the plate J, its T-head $t$, and eye $t'$.

6. The combination of the set-screw $i$, having a threaded portion larger than the stem, with the plate E, having a recess, $i'$, terminating in an enlarged threaded opening, $w$.

7. The combination of the set-screw $i$ of the character described, and the plate E, having a slot, $i'$, enlarged at the end, with the hub $p$ and its recess $x$.

In testimony whereof I have signed my name to this specification in the presence of two subscribing witnesses.

GEORGE W. HASKELL.

Witnesses:
HERMANN MOESNER,
HARRY SMITH.